Figure 1:
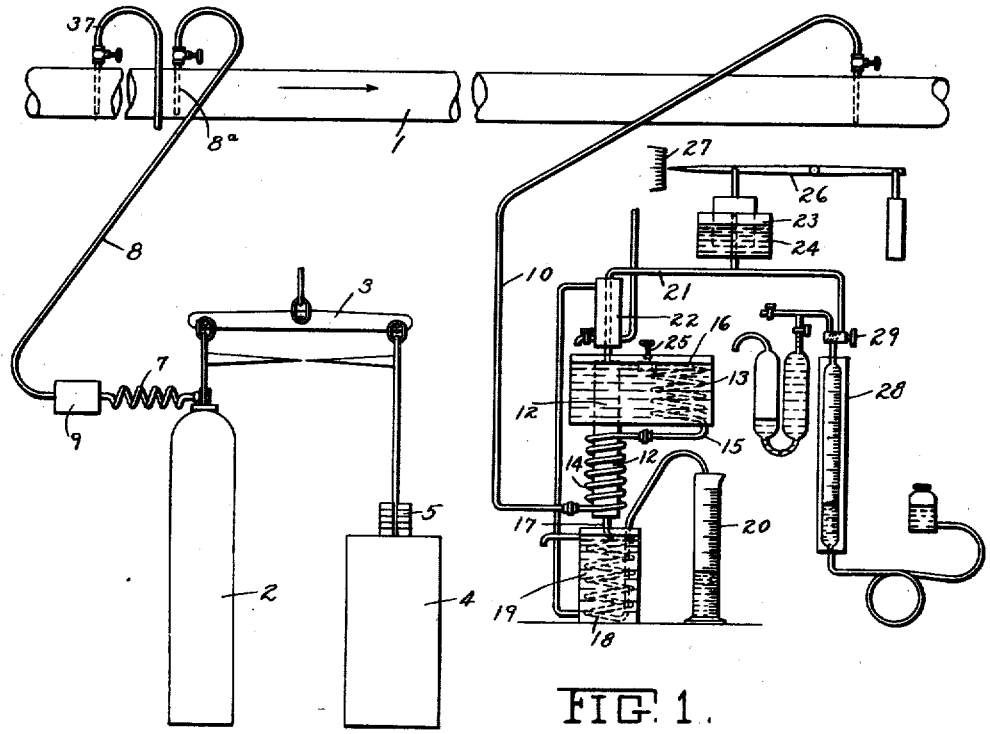

E. G. BAILEY.
APPARATUS FOR MEASURING THE RATE OF FLOW OF FLUIDS.
APPLICATION FILED DEC. 28, 1917.

1,299,539.  Patented Apr. 8, 1919.

Inventor
Ervin G. Bailey
By Joseph P. Livermore
Attorney

UNITED STATES PATENT OFFICE.

ERVIN G. BAILEY, OF NEWTON HIGHLANDS, MASSACHUSETTS, ASSIGNOR TO BAILEY METER COMPANY, OF BOSTON, MASSACHUSETTS, A CORPORATION OF MASSACHUSETTS.

APPARATUS FOR MEASURING THE RATE OF FLOW OF FLUIDS.

1,299,539.  Specification of Letters Patent.  Patented Apr. 8, 1919.

Application filed December 28, 1917. Serial No. 209,305.

*To all whom it may concern:*

Be it known that I, ERVIN G. BAILEY, a citizen of the United States, residing in Newton Highlands, in the county of Middlesex and State of Massachusetts, have invented an Improvement in Apparatus for Measuring the Rate of Flow of Fluids, of which the following description, in connection with the accompanying drawings, is a specification, like figures on the drawings representing like parts.

The present invention relates to an apparatus which is especially valuable for measuring the rate of flow of fluids, but is not limited to that purpose, since the apparatus is capable of use in determining the proportional quantity of a gas which is dissolved in a liquid. When used for its chief function, however, viz: measuring the rate of flow of fluids, the apparatus comprises, in addition to the means for separating a gas from a fluid with which it is commingled, means for introducing the gas into the fluid at a known rate so that by subsequently separating the gas from the fluid, and ascertaining the relative quantities of the two the result affords data for ascertaining the rate of flow of the fluid.

This apparatus is especially adapted for use in connection with the method for measuring the rate of flow of fluids which forms the subject matter of application for Letters Patent of the United States filed by me on the 16th day of July, 1915, Serial Number 40,238.

That part of the apparatus which is used for determining the ratio of the flowing fluid to the gas contained therein, consists in means for removing a sample of the mixed fluid and gas combined with means whereby the two are completely separated from each other, and separately measured so that the exact ratio between the two can be obtained.

The entire apparatus is especially adapted for use in test work and meter calibration and it is found to give a high degree of accuracy under practically all conditions. It is especially valuable for measuring steam consumption in cases where the actual quantity of the water or steam consumed cannot be weighed or in cases where the necessary changes in, or additions to, piping and equipment to obtain actual weights would involve too much expense to be practicable. The apparatus is especially useful in measuring the flow of steam, or water, or a mixture of both through pipes, and I have found in most cases that carbon dioxid ($CO_2$) is the most suitable gas to add owing to its convenient and cheap commercial form and its great solubility.

For convenience I will illustrate and describe the apparatus as adapted for use in measuring the rate of flow of steam, utilizing carbonic acid gas as the ingredient to be mixed with the steam.

Figures 2, 3:
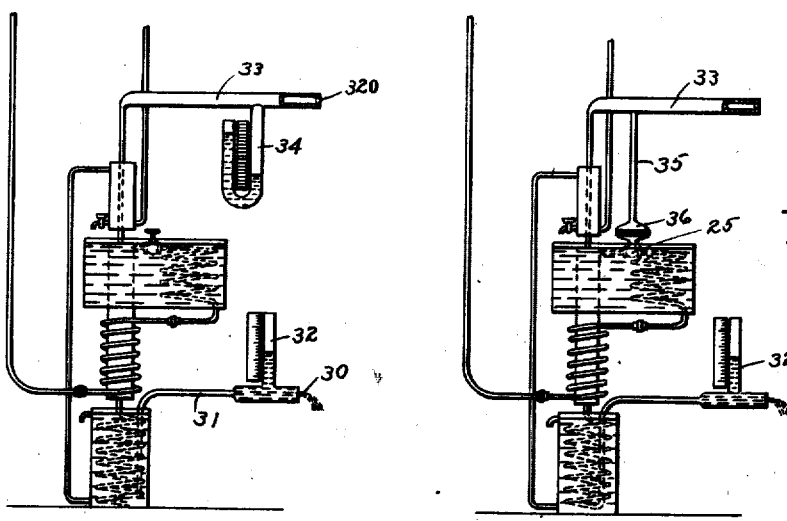

Figure 1 is a diagram view of a complete apparatus for measuring the rate of flow of a fluid, it being assumed that steam is the fluid to be measured. Fig. 2 is a partial view of an apparatus embodying a modification; and Fig. 3 is a similar view showing a further modification.

Referring to Fig. 1, the pipe line 1 contains the flowing fluid such as steam, the rate of flow of which is to be determined. The carbon dioxid gas which is the foreign substance to be used is contained in a tank 2 which is shown as supported on a weighing device such as a scale beam 3, the tank being balanced by a weight 4 which is provided with smaller weights 5 to balance the weight of the gas. The smaller weights are removed from time to time during the operation of the apparatus, to determine the amount of gas taken from the tank.

The gas is introduced into the pipe 1 through a flexible connector 7 and pipe 8 between which is a pressure regulator 9 so that the flow of gas into the conduit is not only known as to quantity but enters at a substantially constant rate.

The tube 8 is provided within the conduit 1 with a nozzle $8^a$ which, if desired, may be perforated for the purpose of thoroughly mixing the gas with the steam, although this is not essential, especially if there are fittings and bends in the pipe line between the point where the gas is introduced and the point where the sample is to be taken out as hereinafter described.

The rate of flow of steam which is to be measured is of course unknown, while as above stated, the rate of flow of $CO_2$ into the conduit is known and substantially constant as well as continuous during a known time, so that if a representative sample of the mixture is taken out and the quantity of the gas and that of the steam are determined, the ratio of one to the other will enable the actual rate of flow of the steam to be readily computed.

For the purpose of making the determination of the ratio, a sample of the mixed steam and gas is taken from the conduit 1 after the two have been thoroughly mixed; and in the apparatus shown, a pipe 10 leads to the separating and measuring or indicating devices which may be described as follows:

The sample of steam containing the carbon dioxid is first condensed, being led for that purpose through the pipe 15 and cooling coil 13 into the upper part of a receiving chamber 12, the coil and the upper part of the receiving chamber being contained in a receptacle supplied with a cooling element such as water. This reduces the sample to liquid form which is mainly water with a considerable portion of the gas remaining therein in solution.

The liquid then falls to the lower part of the chamber 12 and in order completely to separate the gas from the water, it is thoroughly boiled. For the purpose of causing the boiling and consequent separation, the lower part of the chamber 12, or boiling zone, as it may be called, is subjected to heat by any suitable means such as a heating coil 14. When the flowing fluid under observation is steam, the steam itself can be used as a source of heat, and in the construction shown the sample coming through the pipe 10 first passes through the heating coil 14 on its way to the condensing coil 13. If the flowing fluid under observation is water instead of steam it is obvious that the boiling zone of the chamber 12 may be heated by any other suitable expedient, and the condenser may be dispensed with altogether. After the separation has taken place, the gas rises to the top of the chamber while the water falls to the bottom, the said chamber being provided at the bottom with an open outlet pipe 17 leading to a cooling coil 18 in a jacket 19 through which coil the water flows into a measuring vessel 20.

In the meanwhile, the gas is thoroughly expelled from the water by the boiling thereof and passes up through a pipe 21 which is surrounded by a cooling jacket 22 for the purpose of condensing any steam that may be driven off with the gas, and thence into a gasometer 23 which is sealed by liquid contained in a vessel 24. The sample taken from the steam line is kept running continuously at a rate which is controlled by a valve 25 at the inlet to the separating chamber 12, the water collecting in the measuring vessel 20 while the gas accumulates in the gasometer.

For the purpose of measuring the quantity of each of the separated elements to obtain the ratio between them, simultaneous measurements are taken of the water and of the gas. In the construction shown, the vessel 20 is graduated, and the gasometer is provided with a pointer 26 moving over a graduated scale 27 and readings of the respective graduations will show the amount of water and the amount of gas accumulated during the given period. By reducing both of the elements to a weight basis, it is obvious that the ratio of one to the other is determined; and this ratio multiplied by the rate at which the gas has been added to the steam during the same period, given in suitable units, will show the rate of flow of steam through the pipe 1 during this period.

For the purpose of measuring the gas with possibly greater accuracy than that obtained by the gasometer scale, I have shown the apparatus as provided with a measuring burette 28 connected with the pipe 21 and provided with a three-way cock 29. The burette is shown as provided with an absorption pipette for absorbing the carbon dioxid and separating it from any other gases to determine the actual amount existing. When the burette is used, the flow of the sample is continued until a suitable amount of gas has accumulated when the cock 29 is opened from the gasometer into the burette until the pointer reaches a predetermined position of the gasometer scale. The cock 29 is then closed and the operation repeated until the end of a test period when the measurement is noted of the total accumulation of gas and liquid for that period.

As shown in Fig. 1 the pipe 18 on its way to the receptacle 20 rises above the level of the bottom of the boiling chamber 12 so that the liquid will remain at a certain height in said chamber.

There are a small amount of air and usually some carbon dioxid originally in the water or steam which is being measured, but it is possible to add the gas or carbon dioxid at such a high rate that the original amount of such substance in the flowing material will be an insignificant percentage so that its presence will cause no appreciable inaccuracy in the final results. If however it is not desirable to add enough of the gas to make the original amount a negligible quantity a test can be made to determine the actual amount of air or other gases originally in the steam or water so that a suitable allowance can be made in the total quantity of gas obtained from the sample. In most cases the ratio of gas originally in the steam or water is so nearly constant that a blank determination can be made before or after a test and this determination applied as a correction for the test. In other cases, however, where the initial amount of the foreign gas is likely to vary, a determination thereof can be made continuously during the test by drawing a sample from the conduit before the gas for measurement has been introduced, and treating the said sample as the sample of the mixture subsequently drawn out is treated. In other words the separating appliances can be duplicated and one used in advance of the means for introducing the gas, and the other after the gas has been introduced and mixed. The pipe 37 is shown in advance of the pipe 8, it being assumed that this leads to a separating apparatus like that shown at the right hand side of the sheet.

In the modification shown in Fig. 2, I have indicated means whereby the measurements of the fluid and the gas may be continuously indicated as a quantity rate per unit of time, so that a reading may be taken at any time without stopping to take measurements. In this case, the water separated from the sample is allowed to discharge through an orifice 30 at the end of a discharge pipe 31, the said discharge pipe being provided with a graduated pressure gage 32 which may be graduated to indicate the rate of discharge of the water separated from the sample. The gas separated from the sample is discharged continuously through an orifice 320 at the end of a pipe 33 which is also provided with a graduated pressure gage 34.

In Fig. 3, I have shown means whereby the flow of the separated gas is maintained constant, the pipe 33 being connected through a pipe 35 with a regulator 36 cooperating with the control valve 25 to maintain a proper rate of introduction of the sample to keep the flow of the separated gas constant, the corresponding rate of flow of water being indicated as before by means of the pressure gage 32.

When the apparatus is used for separating a gas from a liquid in which it is dissolved, the liquid will be fed to the boiling chamber 12 in which the separation takes place until sufficient quantities of the separated components have accumulated for satisfactory measurement, or until the quantity rate at which the components are given off can be satisfactorily ascertained. The discharge passage for the gaseous component need be subjected to the action of the cooling chamber 22, only if the liquid component is such as to vaporize appreciably in the boiling by which the separation is effected.

While the construction and arrangement herein shown and described constitute a practicable means for effecting the desired results, and are capable of satisfactory and accurate operation, the apparatus is obviously susceptible of many modifications; and it is not therefore intended to limit the invention to the specific construction shown.

What I claim is:

1. An apparatus for measuring the rate of flow of fluids, comprising means for introducing a gas at a known rate into the flowing fluid whereby said fluid and gas are mixed; means for removing a representative sample of the said mixed fluid and gas; means for separating the gas from the fluid in the sample; and means for measuring the relative quantities of the said separated gas and fluid.

2. An apparatus for measuring the rate of flow of steam, comprising means for introducing carbon dioxid into the flowing steam at a known rate whereby said steam and carbon dioxid become mixed; means for removing a representative sample of said mixed steam and carbon dioxid; means for condensing said sample of the mixture; means for boiling the condensate to separate the carbon dioxid from the steam comprised in said sample, and means for measuring the relative quantities of steam and carbon dioxid which have been thus separated from one another in said sample.

3. In an apparatus for measuring the rate of flow of liquid in a closed conduit, the combination with means for introducing a gas into the conduit at a known rate whereby said gas and liquid become mixed, of means for extracting a representative sample of the said mixed liquid and gas; a separating chamber and means for introducing the said sample into said chamber; means for heating the said chamber to the boiling point of said liquid; an outlet for gas from the top of said chamber; an outlet for the liquid from the bottom of said chamber; and means for measuring the quantity of gas, and the quantity of liquid, delivered from the respective outlets from the separating chamber.

4. In an apparatus for measuring the rate of flow of steam in a closed conduit; the combination with means for introducing carbon dioxid gas into the conduit at a known rate whereby said carbon dioxid gas and steam become mixed, of means for extracting a representative sample of said mixed steam and gas; means for condensing said sample; a separating chamber to receive the condensed sample; means for heating said chamber to the boiling point; an outlet for gas from the top of said chamber; means for condensing the steam which would otherwise escape with the gas and returning the condensate thereof to said separating chamber; an outlet for the condensate from the bottom of said chamber; and means for ascertaining the relative amount of gas and condensate when thus separated from one another.

5. In an apparatus for measuring the rate of flow of fluid in a closed conduit the combination with means for introducing a gas into the conduit at a known rate, whereby said fluid and gas become mixed; of means for extracting a representative sample of said mixed fluid and gas; means for condensing said sample; a separating chamber to receive the condensed sample; means for heating said chamber to the boiling point of said liquid; an outlet for gas from the top of said chamber; an outlet for the liquid from the bottom of said chamber; and means for measuring the quantity of gas and the quantity of liquid delivered from the respective outlets of said separating chamber.

In testimony whereof, I have signed my name to this specification.

ERVIN G. BAILEY.